United States Patent [19]
Gocho et al.

[11] Patent Number: 5,002,262
[45] Date of Patent: Mar. 26, 1991

[54] APPARATUS FOR CHARGING MATERIAL TO BE SINTERED INTO A SINTERING MACHINE

[75] Inventors: Makoto Gocho; Masayasu Shimizu; Hidetoshi Noda; Osamu Komatsu; Hideaki Inoue, all of Tokyo, Japan

[73] Assignee: NKK Corporation, Tokyo, Japan

[21] Appl. No.: 406,104

[22] Filed: Sep. 12, 1989

[30] Foreign Application Priority Data

Sep. 13, 1988 [JP] Japan .................................. 63-229518
Sep. 16, 1988 [JP] Japan .................................. 63-232051

[51] Int. Cl.$^5$ .......................... C21B 7/16; B65G 25/00
[52] U.S. Cl. ...................................... 266/78; 266/100; 266/176; 414/148
[58] Field of Search .................... 266/78, 92, 100, 176, 266/177, 178; 75/5; 414/148, 150, 157

[56] References Cited
U.S. PATENT DOCUMENTS

| | | | |
|---|---|---|---|
| 2,614,829 | 10/1952 | Kelsey | 266/176 |
| 2,895,231 | 7/1959 | Sylvest | 266/178 |
| 3,179,391 | 4/1965 | Connell | 266/178 |
| 3,262,770 | 7/1966 | Tsujihata et al. | 266/178 |
| 3,361,315 | 1/1968 | Sheets | 75/5 |
| 4,120,643 | 10/1978 | Benoit | 75/5 |

*Primary Examiner*—S. Kastler
*Attorney, Agent, or Firm*—Fleit, Jacobson, Cohn, Price, Holman & Stern

[57] ABSTRACT

An apparatus for charging material to be sintered into a sintering machine comprises a shuttle conveyor transporting pelletized material to be sintered, a wide conveyor receiving said pelletized material from the shuttle conveyor and feeding the pelletized material to a pallet moving in a predetermined direction, a deflector plate receiving the pelletized material from the wide conveyor and feeding the pelletized material to the pallet and a support plate supporting the material fed to the pallet from behind, the support plate being arranged facing the deflector plate below the wide conveyor and over the upper side of the pallet.

4 Claims, 1 Drawing Sheet

APPARATUS FOR CHARGING MATERIAL TO BE SINTERED INTO A SINTERING MACHINE

BACKGROUND OF THE INVENTION

1. Field of the Invention

The present invention relates to an apparatus for charging pelletized material to be sintered into a sintering machine, and more particularly to an apparatus for feeding material from a conveyer to a bed of the sintering machine and controlling a distribution of particle sizes of the material in the direction of a height of material layers formed on the bed.

2. Description of the Prior Art

In an ordinary sintering machine, material to be sintered has been hitherto stored in a surge hopper, cut off by a roll feeder positioned in the lower side of said surge hopper and fed to a pallet travelling at a predetermined speed by means of a deflector plate. The material is stacked up in layers to a predetermined height on the pallet by means of said deflector plate and travels together with the pallet. Carbonaceous material contained in the material is ignited by an ignition furnace from the upper side thereof. Sintering of the material layers proceeds from an upper portion of the material layers to a lower portion thereof by the use of an exhaust duct positioned on the lower side of the pallet and an exhauster connected to the exhaust duct.

However, a new method for sintering green pellets wherein said green pellets of 8 mm in particle size is prepared by pelletizing powdery material to be sintered and fed to a sintering machine, has developed highly. As a result, gas permeability of sintering bed, reducibility of sintered product and the yield thereof are increased and sintering of the material has become more effective. In this case, the material pelletized with much effort has a possibility of being crushed in a surge hopper or during cutting of the material from a roll feeder. Moreover, since material of comparatively large particle size out of the material which has been put on a pallet is liable to roll over the pallet and material of small particle size is difficult to roll, a distribution of particle sizes of the material varies in the upward and downward directions of material layers stacked up on the pallet. In the case that differences in the distribution of particle sizes are large, the material is not sintered uniformly in the upward and downward directions and nonuniformity of quality of sintered product can take place.

SUMMARY OF THE INVENTION

It is an object of the present invention to overcome the above-mentioned difficulties in the prior art apparatuses for charging material to be sintered into a sintering machine and to provide an apparatus for charging material to be sintered into a sintering machine, by the use of which material to be sintered is not crushed and a distribution of particle sizes of the material in the upward and downward directions can be controlled on a pallet.

To accomplish the above-mentioned object, the present invention provides an apparatus for charging material to be sintered into a sintering machine comprising:

a shuttle conveyer transporting pelletized material to be sintered;

a wide conveyer receiving said pelletized material from said shuttle conveyer and feeding said pelletized material to a pallet of a sintering machine moving in a predetermined direction;

a deflector plate receiving said pelletized material from the wide conveyer and feeding the pelletized material to said pallet; and a support plate supporting the material fed to the pallet from behind, said support plate being arranged facing said deflector plate below the wide conveyer and over the upper side of said pallet.

The above objects and other objects and advantages of the present invention will become apparent from the detailed description to follow, taken in connection with the appended drawings.

DESCRIPTION OF THE PREFERRED EMBODIMENT

Figure 1:
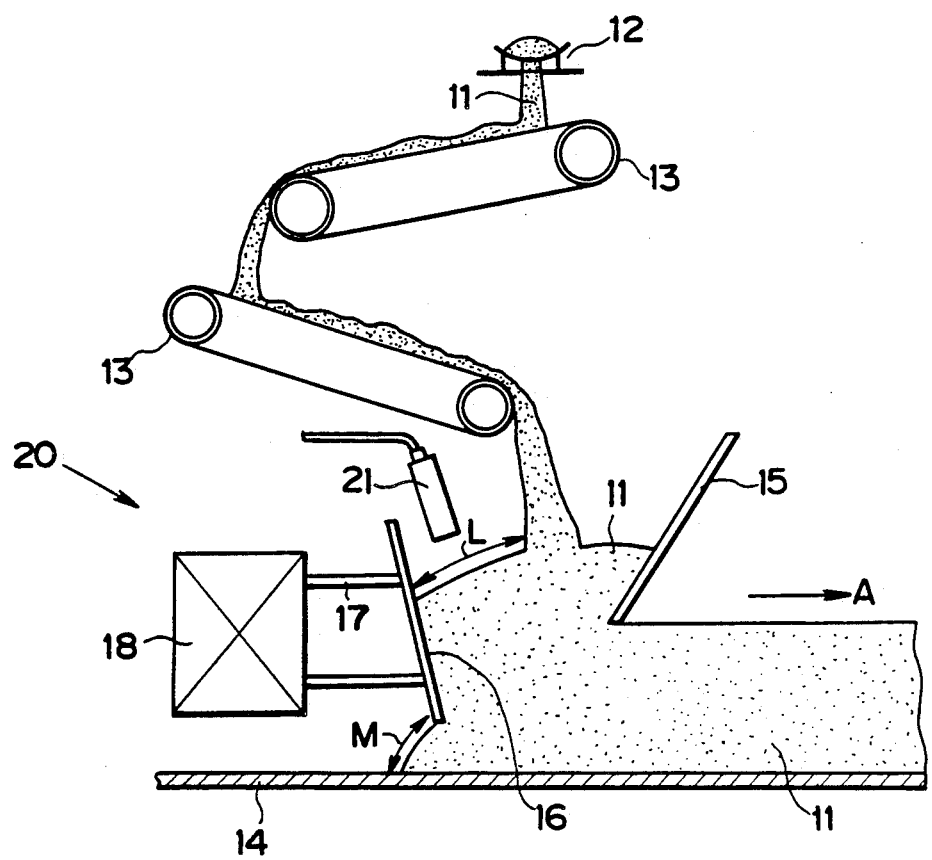
FIG. 1 is a vertical sectional view illustrating a preferred embodiment of the present invention.

An example of the present invention will be described in detail with specific reference to the appended drawings. FIG. 1 is a vertical sectional view illustrating an apparataus for charging material to be sintered into a sintering machine. Shuttle conveyer 12 transporting material 11 to be sintered is arranged. A plurality of wide conveyers 13 are arranged on the lower side of the shuttle conveyer 12. Pallet 14, on which the material to be sintered 11 is stacked up and which moves in the direction of arrow symbol A as shown in FIG. 1, and deflector plate 15 which stacks up the material 11 to be sintered to a predetermined height of layers are arranged on the lower side of the wide conveyers 13. Device 20 for controlling a state of stacked material to be sintered, which controls a state of stacked material behind the material 11 stacked up on said pallet 14, arranged. Said device 20 for controlling a state of stacked material comprises support plate 16 supporting the material 11 stacked up on the pallet 14 from behind, a plurality of support bars 17 supporting said support plate 16 and drive controlling device 18 controlling an inclination of the support plate 16 by driving an upper support bar and a lower support bar in the reverse directions, respectively. Said drive controlling device 18 can also drive the support plate 16 forward and backward relative to the direction (shown with arrow symbol A) of a movement of the material. The support plate 17 can be driven forward and backward by the use of driving wheels by having said drive controlling device 18 supported on rails arranged in an appropriate position. The support plate 17 can also be driven upward and downward by the control device 18. A plurality of monitoring sensors 21 for monitoring a state of the material 11 stacked up near the support plate 17 are arranged. An industrial television camera and a supersonic range finder are included in each of the monitoring sensors 21. The industrial television camera and the supersonic range finder are remote-controlled from a control room (not shown). A work of the apparatus for charging material to be sintered into a sintering machine which is constituted in such a manner as described above will be described below. The material 11 to be sintered is fed from a pelletizer (not shown for simplifying an explanation) to the shuttle conveyer 12. The end of the shuttle conveyer 12 reciprocates in the direction of a belt of the shuttle conveyer 12 which is used for feeding material to a wide conveyer uniformly in the direction of a width of the wide conveyer arranged at right angles to a movement of the shuttle conveyer 12. The shuttle conveyer 12 feeds the material 11 to be sintered to the wide conveyer 13 on the lower side of the shuttle conveyer 12 uniformly in the direction of the width of the wideconveyer 13. The material 11 having reached through a plurality of the wide conveyer a position on the upper side of the pallet 14 where the material 11 is charged is put on the pallet 14 uniformly in the direction of the width of the pallet 14 between deflector plate 15 and the support plate 16. Since the material 11 pelletized by means of said pelletizer is not stored in the surge hopper and not cut off by the roll feeder, an amount of crushed material particles are greatly decreased.

The material 11 fed to the pallet 14 is stacked up to a predetermined height by means of the deflector plate 15 and moves together with the pallet 14 in the direction of arrow symbol (A) as shown in FIG. 1. Thereafter, carbonaceous material contained in the material 11 is ignited from above by an ignition furnace. As in the example of the prior art apparatus, sintering of the material 11 proceeds from the upper side to the lower side of material layers by the use of an exhaust duct positioned on the lower side of the pallet 14 and an exhauster connected to the exhaust duct.

Stacked material 11 to be sintered is supported by said support plate 16 which faces the deflector plate 15 and is located behind the material 11. Spherical material to be sintered falls from the wide conveyer 11 to the surface of stacked material. The spherical material rolls down at only a small distance (L shown in FIG. 1), as stacked material 11 is supported by said support plate 16. The distance, through which spherical material rolls down, has a gentle slope. Accordingly, there is decreased a segregation of particle sizes of the material 11 formed on the pallet in the upward and downward directions as a result that large size particles relatively liable to roll down are stacked up in a lower portion of material layers and small size particles in an upper portion of the material layers. Accordingly, nonuniformity of quality of sintered products due to the segregation of particle sizes is decreased.

There are some cases when a slight segregation of particle sizes is desirable depending on a method of blending or manufacturing sintered products. For example, in the case that quality of sintered pellets is improved by having pulverized coal and powdery coke being powdery fuel as fuel for sintering sticked to the surfaces of material to be sintered, a larger amount of powdery fuel is desired to be in a upper porition of material layers on the pallet 14 than in a lower portion of the material layers. Since air for combustion flows from an upper portion to a lower portion of the material layers and sintering of the material proceeds from the upper portion to the lower portion of the material layers, the material to be sintered in the lower portion of the material layers is kept at high temperatures longer than the material in the upper portion of the material layers. In consequence, less powdery fuel is required.

A distribution of the powdery fuel in the upward and downward directions is controlled by adjusting the inclination of the support plate 16 of the device 20 for controlling material layers by driving the support bars 17 or by shifting positions of the support plate 16 forward or backward by the use of the drive controlling device 18 or by shifting positions of the support plate 16 upward and downward by the use of the device 18. Both of the inclination and the position of the support plate 16 or any of them are adjusted depending on properties of the material to be sintered. That is, mainly, upward and downward distribution of powdery material present in the material layers are controlled depending on the distance L, through which the material rolls down, and the inclination of the distance L. A distance (shown with M in FIG. 1) between the pallet 14 and the end of the support plate 16 is changed by making an inclination movement of the support plate 16. Thereby, segregation of particle sizes of the material under the support plate 16 can be controlled. In this way, the segregation of particle sizes in the upper portion and the lower portion of the material stacked up on the pallet can be decreased by the forward and backward movements or the inclination movement of the support plate 16 by means of the drive controlling device 18. As a result, sintered products of stable properties can be obtained.

Monitoring device 21 for monitoring and detecting the distance L of rolling of the material and the inclination of the support plate 16 is arranged near a position where the material to be sintered is charged. A television camera or supersonic sensors can be used as sensors for the monitoring device. The television camera is used for visually catching a state of stacked material to be sintered and the supersonic sensors for quantitatively recognizing the height of material layers.

What is claimed is:

1. An apparatus for charging material to be sintered into a sintering machine comprising:
   a shuttle conveyor for transporting pelletized material to be sintered;
   a wide conveyor for receiving said pelletized material from said shuttle conveyor and feeding said pelletized material to a pallet moving in a predetermined direction;
   a deflector plate for receiving said pelletized material from the wide conveyor and feeding the pelletized material to said pallet;
   a support plate for supporting the material fed to the pallet from behind, said support plate facing said deflector plate below the wide conveyor and above said pallet;
   a control device for controlling at least one of the inclination, height and horizontal position of the support plate; and
   a monitoring device for monitoring the height of pelletized material on the pallet between the support plate and the deflector plate.

2. The apparatus of claim 1, wherein said control device comprises a plurality of support bars for supporting the support plate and a drive controlling device for controlling forward and backward movements, up and down movements and inclination of the support plate.

3. The apparatus of claim 1, wherein said monitoring device comprises an industrial television camera and a supersonic range finder as sensors.

4. The apparatus of claim 1 wherein the control device has means for controlling the inclination, the height and the horizontal position of the deflector plate.

* * * * *